March 7, 1950     H. A. JOHNSON     2,499,922
GUARD FOR LAWN MOWERS
Filed Oct. 14, 1946
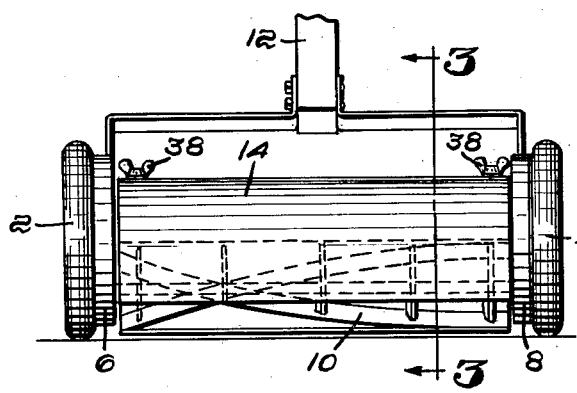
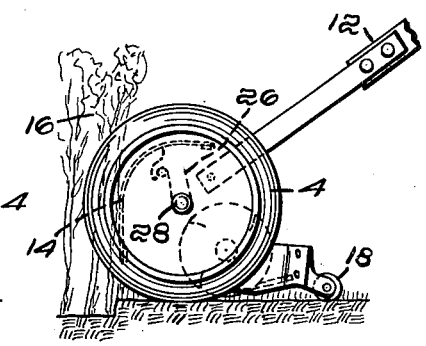
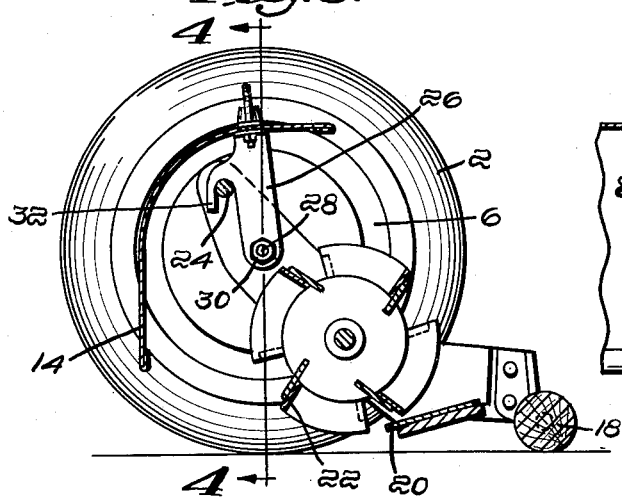
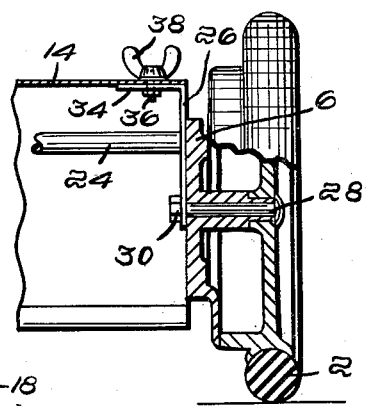
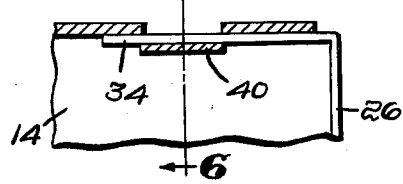
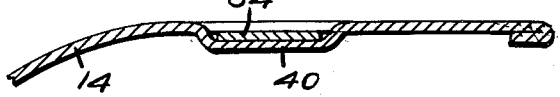
Inventor:
Howard A. Johnson,
by Yardley Chittick
Attorney Patented Mar. 7, 1950

2,499,922

UNITED STATES PATENT OFFICE 2,499,922

GUARD FOR LAWN MOWERS

Howard A. Johnson, Melrose, Mass.

Application October 14, 1946, Serial No. 703,196

3 Claims. (Cl. 56—249)

This invention relates to lawn mowers, and is particularly concerned with the provision of a guard located in front of the rotating blades to protect plants and shrubbery from being inadvertently cut by the mower should it be pushed beyond the confines of the lawn.

It is recognized that lawn mower guards of certain types are shown in the earlier patented art. However, the guard of the present invention differs from previous constructions in that it may be readily attached as an auxiliary unit to practically all of the existing types of lawn mowers. The guard likewise is designed so that it may be easily removed if it is desired to operate the lawn mower with the cutting blades exposed. The nature of the invention will be more fully understood as the description proceeds with the aid of the accompanying drawings, in which Fig. 1 is a front elevation of a lawn mower with the guard in place.

Fig. 2 is a side elevation showing the nature of the protection afforded by the guard.

Fig. 3 is an enlarged vertical section on the line 3—3 of Fig. 1.

Fig. 4 is an enlarged fragmentary vertical section on the line 4—4 of Fig. 2.

Fig. 5 is an enlarged sectional elevation showing a modified form of guard-attaching means.

Fig. 6 is a section on the line 6—6 of Fig. 5.

In Fig. 1 is shown a conventional lawn mower, having a pair of spaced wheels 2 and 4 with the usual gearing at 6 and 8 to drive a typical multiple-blade cutter 10 in the customary manner. The handle 12 is connected to the machine proper in the ordinary way.

The guard that overlies the blades is shown at 14 and will be more particularly described hereinafter. It is made to a width that will fit comfortably between the driving mechanisms 6 and 8 and over the usual tie bar that extends from side to side.

Fig. 2 illustrates the general manner in which a lawn mower provided with a guard made according to my invention will operate. Its lower edge is high enough to permit the grass to be cut in the usual manner, but at the same time the guard will effectively keep shrubbery and plants illustrated at 16 from being cut when the machine is pushed to a point where, were it not for the guard, such unintentional cutting would take place. All users of lawn mowers will appreciate the difficulty of stopping the lawn mower exactly at the edge of the lawn when there are plants close to the lawn's edge. The present invention enables the user to push the machine beyond the edge of the lawn with the guard coming into actual engagement with the plants or flowers to move them to a position where they cannot be damaged by the cutter.

Figs. 3 and 4 show in more detail the construction of the guard. 2 is one of the wheels, 18 the roller, 20 the stationary cutting blade, 22 the rotating cutting blades, and 24 the tie bar that extends from one wheel to the other.

The guard 14 is preferably made from a flat sheet of metal or any other suitable sufficiently rigid material, such as fibre board, heavy screening, etc. In the form shown it has been bent through substantially 90 degress, but the curvature of the band is relatively immaterial. The dimensions of the guard likewise are not critical, except that the lower edge should be far enough above the ground to avoid any interference with the grass cutting operation, while the upper edge may be terminated at any position back of the point of connection with the guard-supporting means.

Means for connecting the guard to the machine is illustrated in Figs. 3 and 4. A preferred form consists of a generally vertical plate 26, having an opening or aperture at its lower end through which the wheel bolt or shaft 28 may extend. Nut 30, when applied to wheel bolt 28, serves to maintain the bolt in its usual position and to anchor the lower end of plate 26. The forward upper end of plate 26 has an inverted U-shaped hook formed by the depending finger 32. This finger or hook is preferably formed integral with the plate 26 and is located so that when it is hooked over the tie bar 24, the lower opening or aperture in the plate 26 will be suitably aligned to receive bolt 28. It will be understood, of course, that the plate 26 may be bent laterally if necessary to conform to the side of the gear housing, but such deformation will not affect the capacity of hook 32 to engage the bar 24.

As shown in Fig. 4, the upper end of plate 26 is bent inwardly so as to provide a short flat horizontal member 34 on which rests guard 14. On the other side of the machine is a corresponding guard-supporting plate, and these two together are sufficiently strong to carry the loads that will be imposed in normal operation. Guard 14 and member 34 may be connected in any convenient manner. One method is shown in Figs. 3 and 4, in which a bolt 36 and thumb nut 38 are used. In order that there may be some room for adjustment, member 34 and guard 14 may be slotted at their overlapping areas, so that a common cut-away area may be easily located through which the bolt 36 may be passed to be engaged by thumb nut 38.

If found more convenient, other means for connecting the guard 14 to members 34 of plates 26 may be used. The two could be made integral, or they might be welded together if designed for use with a particular machine of known dimensions. In general, however, since the dimensions of various lawn mowers differ slightly, some type of adjustable connection is preferable. It should be pointed out in this connection that the distance between the wheel bolt 28 and tie bar 24 will likewise probably differ slightly in different makes of lawn mowers, but this will not affect the utility of the present combination because the distance from the aperture at the lower end of plate 26 to the hook area defined by finger 32 will be sufficiently great to be usable on the various different brands of machines.

Another form of connection suitable for use between plate 26 and guard 14 is shown in Fig. 5, in which a narrow depressed band 40, the ends of which are integral with guard 14, has been struck by a suitable die and depressed to receive the horizontal end 34 of plate 26. Fig. 6, being a section on the line 6—6 of Fig. 5, further illustrates the nature of this construction.

It will also be understood that the means of connecting the upper portion 26 to the tie bar 24 may be varied. The essential feature is that any forward rotation of plate 26 be effectively prevented and this is accomplished by connecting the plate to the machine at at least two points, namely, one point on the wheel housing and the other on the tie bar.

I claim:

1. As an article of manufacture, an independent detachable guard for use with a lawn mower of the type having a tie rod, said guard comprising a curved sheet of material adapted to be placed between the wheels of a lawn mower above and in front of the revolving cutter, means for supporting said sheet in said position on a lawn mower, said means comprising two vertical strips of sheet material connected to said curved sheet at opposite side edges of said sheet and extending downwardly from the point of connection, each strip having an aperture therethrough at its lower end and an inverted U-shaped hook integral with said strip and located between said aperture and said curved sheet.

2. As an article of manufacture, an independent detachable guard for use with a lawn mower, said guard comprising a sheet of thin material of greater width than length and curved along its shorter dimension so that one long edge area is substantially at right angles to the other long edge area, means for supporting said sheet with one long edge area substantially horizontal and the other long edge area substantially vertical, said means comprising a pair of upright members of sheet material secured one at each end of said sheet, the vertical dimension of each member being less than the vertical dimension of said curved sheet, each member having an aperture at its lower end, each member having a hook above said aperture extending in the direction of the inner curved surface of said sheet.

3. As an article of manufacture, an independent detachable guard for use with a lawn mower, said guard comprising a sheet of thin material of greater width than length and curved along its shorter dimension so that one long edge area is substantially at right angles to the other long edge area, means for supporting said sheet with one long edge area substantially horizontal and the other long edge area substantially vertical, said means comprising a pair of upright members of sheet material one at each end of said sheet, the vertical dimension of each member being less than the vertical dimension of said curved sheet, each member having an aperture at its lower end, each member having a hook above said aperture extending in the direction of the inner curved surface of said sheet, the upper end of each member terminating in a horizontal portion extending toward the other member and means adjustably connecting each horizontal portion to the substantially horizontal portion of said sheet and permitting adjustment of said members toward or away from each other.

HOWARD A. JOHNSON.

REFERENCES CITED

The following references are of record in the file of this patent:

UNITED STATES PATENTS

| Number | Name | Date |
| --- | --- | --- |
| 273,469 | Coldwell et al. | Mar. 6, 1883 |
| 597,972 | Graham | Jan. 25, 1898 |
| 1,459,034 | Quimby | June 19, 1923 |
| 2,053,535 | Schielein | Sept. 8, 1936 |
| 2,312,435 | Nelson | Mar. 2, 1943 |
| 2,378,488 | Loewe et al. | June 19, 1945 |